(12) United States Patent
Hannuksela (10) Patent No.: US 8,300,690 B2
(45) Date of Patent: Oct. 30, 2012

(54) METHOD FOR RANDOM ACCESS AND GRADUAL PICTURE REFRESH IN VIDEO CODING

(75) Inventor: Miska M. Hannuksela, Tampere (FI)

(73) Assignee: Nokia Corporation, Espoo (FI)

(*) Notice: Subject to any disclaimer, the term of this patent is extended or adjusted under 35 U.S.C. 154(b) by 934 days.

(21) Appl. No.: 10/620,730

(22) Filed: Jul. 16, 2003

(65) Prior Publication Data

US 2004/0066854 A1 Apr. 8, 2004

Related U.S. Application Data

(60) Provisional application No. 60/396,200, filed on Jul. 16, 2002.

(51) Int. Cl.
*H04B 1/66* (2006.01)
*H04N 7/12* (2006.01)

(52) U.S. Cl. ............... 375/240.12; 375/240.01

(58) Field of Classification Search .......... 348/420, 348/384, 403, 405, 404, 408, 409, 410, 399, 348/400, 419, 390, 169; 382/232, 167, 162, 382/239, 236, 251, 235, 250, 233; 375/240.01, 375/240, 240.12, 240.25, 240.02, 240.27, 375/240.16; 386/68, 111, 112, 109, 52
See application file for complete search history.

(56) References Cited

U.S. PATENT DOCUMENTS

| | | | |
|---|---|---|---|
| 5,386,234 A * | 1/1995 | Veltman et al. .......... | 375/240.13 |
| 5,635,982 A | 6/1997 | Zhang et al. | |
| 5,650,823 A * | 7/1997 | Ngai et al. ............... | 375/240.15 |
| 5,680,483 A * | 10/1997 | Tranchard ................. | 382/239 |
| 5,715,008 A * | 2/1998 | Sekiguchi et al. ....... | 375/240.15 |
| 5,726,711 A | 3/1998 | Boyce | |
| 5,731,840 A * | 3/1998 | Kikuchi et al. .......... | 375/240.16 |
| 5,778,143 A | 7/1998 | Boyce | |
| 6,072,831 A * | 6/2000 | Chen ......................... | 375/240.03 |
| 6,310,609 B1 | 10/2001 | Morgenthaler | |
| 6,499,060 B1 * | 12/2002 | Wang et al. ................ | 709/231 |
| RE39,110 E * | 5/2006 | Moriyama et al. ......... | 369/53.41 |
| 7,149,247 B2 * | 12/2006 | Sullivan ................... | 375/240.01 |
| 2002/0054641 A1 * | 5/2002 | Hannuksela ............. | 375/240.12 |
| 2002/0071485 A1 * | 6/2002 | Caglar et al. ............. | 375/240.01 |
| 2003/0099292 A1 * | 5/2003 | Wang et al. .............. | 375/240.12 |
| 2003/0128292 A1 * | 7/2003 | Kitamura et al. ............ | 348/441 |
| 2003/0156640 A1 * | 8/2003 | Sullivan ................... | 375/240.01 |
| 2003/0169816 A1 * | 9/2003 | Wang et al. .............. | 375/240.12 |
| 2005/0031030 A1 * | 2/2005 | Kadono et al. ........... | 375/240.01 |
| 2005/0281329 A1 * | 12/2005 | Chin ......................... | 375/240.01 |
| 2006/0146934 A1 * | 7/2006 | Caglar et al. ............. | 375/240.12 |

OTHER PUBLICATIONS

International Search Report for International Application No. PCT/US03/22262, mailed Jan. 16, 2004.
Hannuksela, M.; "Simple Packet Loss Recovery Method for Video Streaming"; Proceedings of the 11th International Packet Video Workshop; Apr. 30-May 1, 2001; Kyungju, Korea; pp. 138-143.
Transmission of Non-Telephone Signals; Information Technology—Generic Coding of Moving Pictures and Associated Audio Information: Video; International Telecommunication Union; ITU-T; Telecommunication Standardization Sector of ITU; H.262; Jul. 1995; 211 pages.

* cited by examiner

*Primary Examiner* — Behrooz Senfi
(74) *Attorney, Agent, or Firm* — Alston & Bird LLP (57) ABSTRACT

A Method, And Associated Apparatus for providing random access to, and gradual refresh of, encoded video sequences. Gradual decoder refresh is enabled through the use of isolated regions, flexible macroblock order, and turn-off of loop filter at slice boundaries. Mechanisms are also provided for reliable detection of random access operations and for the reliable signaling of leading frames and ODR (open decoder refresh) pictures.

25 Claims, 4 Drawing Sheets

METHOD FOR RANDOM ACCESS AND GRADUAL PICTURE REFRESH IN VIDEO CODING

CROSS-REFERENCE TO RELATED APPLICATIONS

The present invention claims the priority of application Ser. No. 60/396,200, filed on Jul. 16, 2002.

FIELD OF THE INVENTION

The present invention relates in general to the random access and gradual refresh of video pictures. More specifically, the invention relates to a method for random access and gradual refresh of video pictures in video sequences encoded according to the ITU-T H.264|ISO/IEC MPEG-4 part 10 video coding standard.

BACKGROUND OF THE INVENTION

A video sequence consists of a series of still pictures or frames. Video compression methods are based on reducing the redundant and perceptually irrelevant parts of video sequences. The redundancy in video sequences can be categorised into spectral, spatial and temporal redundancy. Spectral redundancy refers to the similarity between the different colour components of the same picture, while spatial redundancy results from the similarity between neighbouring pixels in a picture. Temporal redundancy exists because objects appearing in a previous image are also likely to appear in the current image. Compression can be achieved by taking advantage of this temporal redundancy and predicting the current picture from another picture, termed an anchor or reference picture. In practice this is achieved by generating motion compensation data that describes the motion between the current picture and the previous picture.

Video compression methods typically differentiate between pictures that utilise temporal redundancy reduction and those that do not. Compressed pictures that do not utilise temporal redundancy reduction methods are usually called INTRA-(or I) frames or pictures. Temporally predicted images are usually forwardly predicted from a picture occurring before the current picture and are called INTER or P-frames. In the case of INTER frames, the predicted motion-compensated picture is rarely precise enough and therefore a spatially compressed prediction error frame is associated with each INTER frame. INTER pictures may contain INTRA-coded areas.

Many video compression schemes also use temporally bi-directionally predicted frames, which are commonly referred to as B-pictures or B-frames. B-pictures are inserted between anchor picture pairs of I- and/or P-frames and are predicted from either one or both of the anchor pictures. B-pictures normally yield increased compression compared with forward-predicted INTER-coded P-pictures. B-pictures are not used as anchor pictures, i.e. other pictures are not predicted from them. Therefore, they can be discarded (intentionally or unintentionally) without impacting the picture quality of future pictures. Whilst B-pictures may improve compression performance compared with P-pictures, their generation requires greater computational complexity and memory usage, and they introduce additional delays. This may not be a problem for non-real time applications such as video streaming but may cause problems in real-time applications such as video-conferencing.

Thus, as explained above, a compressed video clip typically consists of a sequence of pictures, which can be roughly categorised into temporally independent INTRA pictures, temporally differentially coded INTER pictures and (possibly) bi-directionally predicted B-pictures. Since the compression efficiency of INTRA-coded pictures is normally lower than that of INTER-coded pictures, INTRA pictures are used sparingly, especially in low bit-rate applications. However, because INTRA-coded pictures can be decoded independent of any other picture in the video sequence, each INTRA-picture represents an entry (or random access point) into the encoded video sequence i.e. a point from which decoding can be started. Thus, it is advantageous to include a certain number of INTRA-coded pictures in an encoded video sequence, for example at regular intervals, in order to allow random access into the sequence. Furthermore, a typical video sequence includes a number of scenes or shots. As the picture contents may be significantly different from one scene to another, it is also advantageous to encode the first picture of each new scene in INTRA format. In this way, even if no other INTRA-coded frames are included in the encoded sequence, at least the first frame in each scene provides a random access point. Each independently decodable series of pictures within an encoded video sequence, starting with an INTRA-coded frame (constituting a random access point) and ending at the frame immediately preceding the next INTRA-coded frame, is commonly referred to as a Group of Pictures or GOP for short.

Some random access operations are generated by the end-user (e.g. a viewer of the video sequence), for example as the result of the user seeking a new position in a streamed video file. In this case, the decoder is likely to get an indication of a user-generated random access operation and can act accordingly. However, in some situations, random access operations are not controlled by the end-user. For example, a spliced or edited stream may contain "cuts" in the coded stream with characteristics similar to random access operations performed by a user. However, in this latter case the decoder may not receive any indication that such a cut has occurred and may not be able to decode subsequent pictures in the sequence correctly. It is therefore important for a video decoder to be provided with a reliable method for detecting random access operations or cuts in an encoded video stream.

Modern video coding standards define a syntax for a self-sufficient video bit-stream. The most popular standards at the time of writing are International Telecommunications Union ITU-T Recommendation H.263, "Video coding for low bit rate communication", February 1998; International Standards Organisation/International Electro-technical Commission ISO/IEC 14496-2, "Generic Coding of Audio-Visual Objects. Part 2: Visual", 1999 (known as MPEG-4); and ITU-T Recommendation H.262 (ISO/IEC 13818-2) (known as MPEG-2). These standards define a hierarchy for bit-streams and correspondingly for image sequences and images. Development of further video coding standards is still ongoing. In particular, standardisation efforts in the development of a long-term successor for H.263, known as ITU-T H.264|ISO/IEC MPEG-4 part 10 are now being conducted jointly under the auspices of a standardisation body known as the Joint Video Team (JVT) of ISO/IEC MPEG (Motion Pictures Expert Group) and ITU-T VCEG (Video Coding Experts Group). Some particular aspects of these standards and, in particular, those features of the H.264 video coding standard relevant to the present invention are described below.

Figure 1:
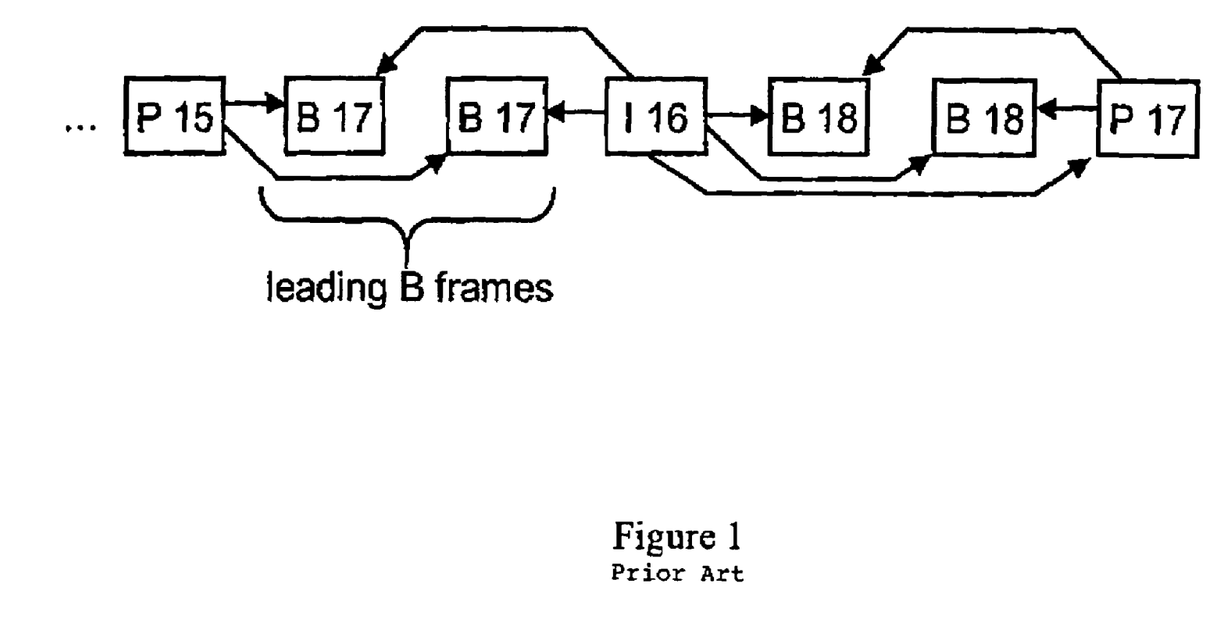
FIG. 1 illustrates an I B B P coded frame pattern and shows the location of leading B-frames.

FIG. 1 illustrates a conventional coded picture sequence comprising INTRA-coded I-pictures, INTER-coded P-pictures and bi-directionally coded B-pictures arranged in a pattern having the form I B B P . . . etc. Boxes indicate frames in presentation order, arrows indicate motion compensation, the letters in the boxes indicate frame types and the values in the boxes are frame numbers (as specified according to the H.264 video coding standard), indicating the coding/decoding order of the frames.

The term "leading frame" or "leading picture" is used to describe any frame or picture that cannot be decoded correctly after accessing the previous I-frame randomly and whose presentation time is before the I-frame's presentation time. (B-frames B17 in FIG. 1 are examples of leading frames). In this description, the term "open decoder refresh" (ODR) picture is used to denote a randomly accessible frame with leading pictures.

Coded frame patterns similar to that shown in FIG. 1 are common and thus it is desirable to make random access to ODR pictures as easy as possible.

A number of alternatives already exist for accessing ODR pictures. A typical solution is simply to discard any leading B-pictures. This is the approach typically adopted in video coding standards that do not allow reference picture selection and decoupling of decoding and presentation order, where an I-picture is always a random access point.

Figure 2:
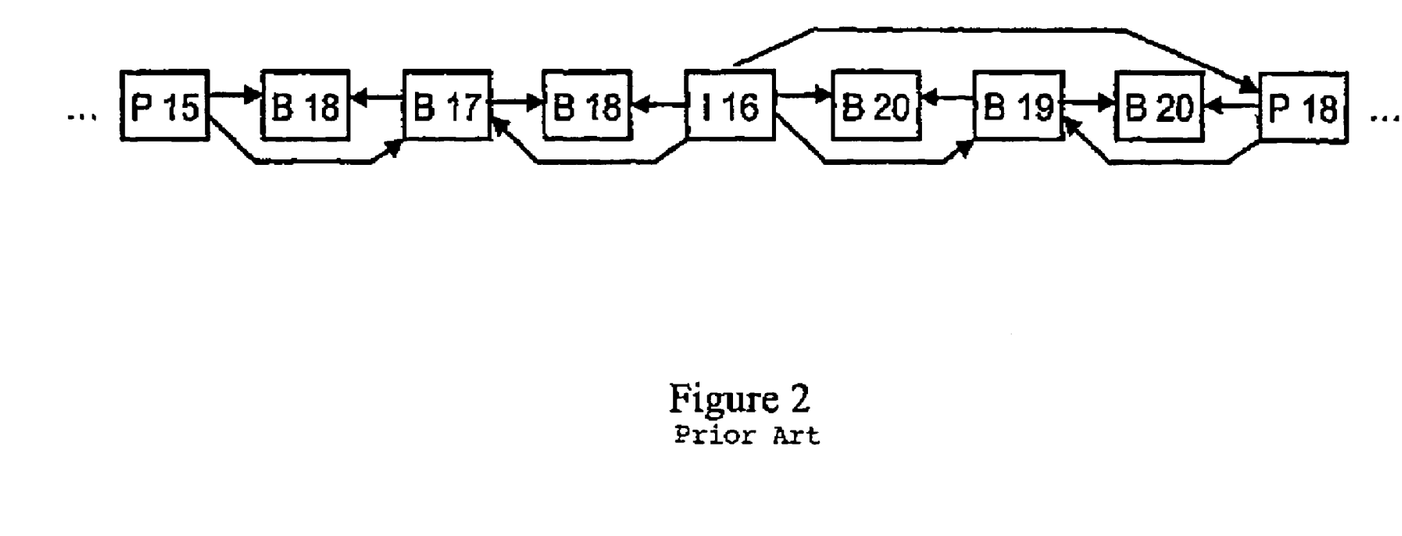
FIG. 2 shows a randomly accessible I-frame with stored leading frames.

Another solution to the problem is to consider all non-stored frames immediately following an I-frame (in coding/decoding order) as leading frames. While this approach works in the simple case depicted in FIG. 1, it lacks the property of handling stored leading frames. An example of a coding scheme in which there is a stored leading frame before a randomly accessible I-frame is shown in FIG. 2. The simple implicit identification of leading frames, just described, does not work correctly in this example.

Figure 3:
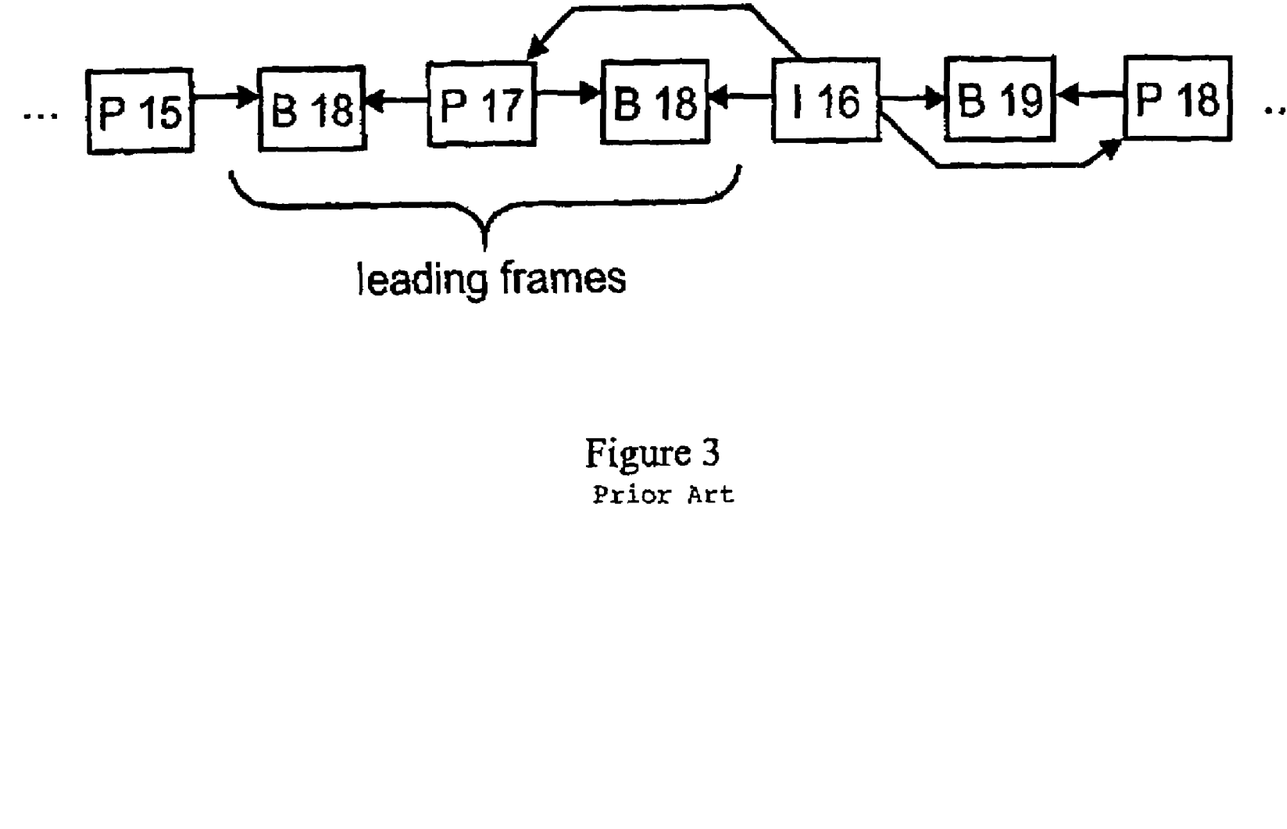
FIG. 3 illustrates the technique of INTRA frame postponement.

A further straightforward idea is to consider all B-pictures occurring after an I-frame (in coding/decoding order) as leading pictures. However, leading pictures may not always be B pictures. For example, the scientific article by Miska M. Hannuksela, entitled: "Simple Packet Loss Recovery Method for Video Streaming", Proceedings of Packet Video Workshop 2001, Kyongju, South Korea, Apr. 30-May 1, 2001 and ITU-T SG16/Q15 document Q15-K38 propose an INTRA-frame postponement method for improved error resiliency in video coding, the adoption of which renders this simple method for the identification of leading frames unworkable. FIG. 3 shows an example of an INTRA frame postponed by one stored frame interval. Consequently, there is one P-frame (P17) preceding the INTRA frame in presentation order.

JVT document JVT-B063 proposes that a frame can be associated with an initialization delay (provided in the video bit-stream as Supplemental Enhancement information) that indicates how long it takes for all subsequent frames in presentation order to be completely correct in content after starting decoding from a particular frame. This initialization delay SEI information may be used when accessing ODR pictures. However, there are three disadvantages associated with this approach. Firstly, the decoder process for handling SEI messages is non-normative i.e. it is not a mandatory part of the H.264 standard and therefore does not have to be supported by all decoders implemented according to H.264. Thus, there could be a standard-compliant SEI-unaware decoder that accesses a standard-compliant stream randomly but fails to decode it due to absent reference frames for leading pictures. Secondly, the decoder may decode some data, such as stored leading frames, unnecessarily as it does not know that they are not useful for the refresh operation. Thirdly, the decoder operation for referring to missing frame numbers becomes more complicated. Consequently, this approach is not preferred as a solution to the random accessing of ODR pictures.

The H.264 video coding standard (as specified in the JVT committee draft) includes the concepts of "instantaneous decoder refresh" and "independent GOP". The term instantaneous decoder refresh refers to a "clean" random access method, where no data prior to an INTRA frame is referred to in the decoding process. An independent GOP is a group of pictures that can be decoded independently from previous or later pictures. An "Instantaneous Decoder Refresh" (IDR) picture signals the start of a new independent GOP. Thus, according to H.264, an IDR picture can be used as a random access point. (For further details, see document JVT-B041 which analyzes the requirements for instantaneous decoder refresh, and JVT-C083 which proposes the syntax, semantics, and standard text for the feature.)

Another concept proposed for inclusion in the H.264 video coding standard is that of "gradual decoder refresh" (GDR). This refers to a form of so-called "dirty" random access, where previously coded but possibly non-received data is referred to and the correct picture content is recovered gradually over more than one coded picture. GDR allows random access capabilities using any type of frame. A signaling mechanism for GDR was first proposed in JVT document JVT-B063 (and then in the JVT output document JVT-B109). JVT-B063 concluded that there are basically two fundamental alternatives to initialize the GDR decoding process, "best-effort decoding" and "assured decoding". In best-effort decoding all unavailable frames are initialized to mid-level gray and decoding of all frames is started but they are considered completely correct in content only after certain indicated conditions are fulfilled. In "assured decoding" the decoder starts decoding from an I-frame and then waits before attempting to decode any more non-I frames to ensure that the remaining frames contain no references to unavailable data. The best-effort alternative was preferred in JVT-B063.

Issues relating to the coding of gradual decoder refresh were studied in JVT document JVT-C074. This document concluded that GDR was impossible to realize using the version of the JVT H.264 codec valid at that time and proposed that a method known as the "isolated region technique" (IREG) should be used for GDR coding.

The isolated region technique was proposed in JVT document JVT-C072. An isolated region is a solid area of macroblocks, defining the shape of the border across which loop filtering should be turned off and to which spatial in-picture prediction is limited. Temporal prediction outside isolated regions in reference frames should be disallowed. The shape of an isolated region may evolve during a number of consecutive coded pictures. The group of pictures (GOP), within which the shape of an isolated region depends on the shape of the corresponding isolated region in a previous picture and which includes the picture containing the initial isolated region coded without temporal prediction, is referred to as a "group of pictures with evolutionary isolated regions" (IREG GOP). The corresponding period (in terms of coded reference frames) is called the "period of evolutionary isolated regions" or "IREG period".

As mentioned above, IREG provides an elegant solution for enabling GDR functionality and can also be used to provide error resiliency and recovery (see JVT document JVT-C073), region-of-interest coding and prioritization, picture-in-picture functionality, and coding of masked video scene transitions (see document JVT-C075). Gradual random access based on IREG, enables media channel switching for receivers, bit-stream switching for a server, and further allows newcomers easy access in multicast streaming applications.

The improved error resiliency property and the gradual decoder refresh property of isolated regions are applicable at the same time. Thus, when an encoder uses isolated regions to achieve gradual decoder refresh, it gets improved error resiliency "for free" without additional bit-rate or complexity cost, and vice versa.

A further concept included in the H.264 video coding standard is that of "flexible macroblock order" (FMO). FMO was first proposed in JVT contribution JVT-C089, and was then included in the JVT committee draft of the H.264 standard. By partitioning pictures into slice groups, FMO allows the coding of macroblocks in an order other than the typical raster scan order. The key application enabled by this mechanism is the implementation of error resilience methods such as scattered slices (see JVT document JVT-C090) and slice interleaving (as proposed in JVT document JVT-C091). Due to its flexibility, other applications of flexible macroblock order are also possible. JVT document JVT-D095 proposes a few enhancements to FMO.

Turning off of the loop filter at slice boundaries was proposed in document JVT-C117 to improve error resilience and to support perfect GDR. This loop filter limitation has two additional advantages: firstly it provides a good solution to the parallel processing problem inherent in the FMO technique and secondly it is a necessity to enable correct decoding of out-of-order slices in time.

SUMMARY OF THE INVENTION

The present invention introduces new methods for implementing random access and gradual refresh of pictures in encoded video sequences. It builds, in particular, on the methods of gradual decoder refresh proposed during development of the H.264 video coding standard and proposes a practical implementation for GDR in the context of the H.264 video codec. However, it should be appreciated that the invention is by no means limited to application within the confines of the H.264 standard and may be applied in other video coding standards in which video sequences are encoded using a combination of INTRA and INTER coded frames and which employ a syntax that is similar to that used in H.264.

More specifically, the present invention proposes an implementation of gradual decoder refresh enabled by using isolated regions, flexible macroblock order, and turning off loop filter at slice boundaries. In particular, the invention tailors the original isolated region technique of JVT-C072 for inclusion in the H.264 video coding standard and introduces a signaling method for gradual decoder refresh.

The invention also proposes a mechanism for the reliable detection of random access operations.

It also proposes mechanisms for the reliable signaling of leading frames and ODR pictures.

As previously mentioned in the background to the invention, the turning off of loop filtering at slice boundaries is advantageous for the implementation of gradual decoder refresh. In particular, loop-filtering across the edge of a refreshed area should be turned off in order to avoid a pixel value mismatch in normal decoding and during decoding after random access. Gradual decoder refresh without the loop filter limitation (i.e. with loop filtering still enabled) is possible and annoying mismatches are not very likely; however, it is difficult to control the amplitude and propagation of mismatches, so it is preferable to turn the loop filter off. Therefore, the present invention proposes that loop filtering is limited in such a way that slice boundaries are handled as picture boundaries. This limitation can be signaled on a picture-by-picture basis. More specifically, according to a preferred embodiment of the invention, if a macroblock and the neighbouring macroblock to its left belong to different slices, the macroblock is filtered as if it were on the left picture boundary. If a macroblock and the neighbouring macroblock above it belong to different slices, then the macroblock is filtered as if it were in the top row of macroblocks in the picture.

The invention further introduces the concept of a "slice group" for use in connection with gradual decoder refresh. According to the invention, a slice group is defined as a group of slices that covers a certain region of a picture, the size of each slice within the group being independently adjustable. Advantageously, the coded size of a slice is adjusted according to the preferred transport packet size. A slice group, as defined according to the present invention, is ideal for implementing gradual decoder refresh using the isolated region approach (as introduced by JVT document JVT-C072 and described earlier in the text). In particular, an isolated region covers a certain spatial area, which can contain more than one slice and its boundaries should be processed in a manner similar to slice boundaries (in particular, loop filtering and INTRA prediction must be turned off). When used to implement gradual decoder refresh, the shape, size, and location of an isolated region evolves, because the gradually refreshed area typically grows from picture to picture. While such shape evolution could be conveyed with the FMO syntax of the H.264 video coding standard, a significant number of bits can be saved when specific FMO syntax for evolutionary shapes is defined.

According to the invention, the shape and position information of isolated regions in consecutive frames are stored. This information is used in motion estimation. The way in which motion estimation/compensation is performed is also modified in order facilitate the use of isolated regions. In particular, when performing full-pixel motion estimation, motion vectors referring outside the isolated regions in corresponding reference frames are discarded without calculating the coding costs. Special measures are also necessary when motion estimation/is performed to non-integer pixel resolution. The H.264 video coding standard allows motion estimation/compensation to ¼ or ⅛ pixel accuracy. Different interpolation filters are used to interpolate ¼ and ⅛ sub-pixels. For ¼ pixel accuracy, ½ sample positions are interpolated using 6-tap filtering, and ¼ sample positions are interpolated by averaging the two nearest samples at integer or ½ sample position. There is one exception to this general rule, known as the "funny position", which is obtained by averaging the four nearest integer samples. As a result of the interpolation process, certain "left-over" regions affect subpixels residing inside but less than 2 integer pixels away from the border of an isolated region. According to the invention, this fact is taken into account when motion estimation to sub-pixel resolution is performed. More specifically, motion vectors referring to blocks closer than two pixels away from the boundary of an isolated region are discarded without calculating the coding costs. A similar operation is performed when ⅛ pixel resolution is used for motion estimation/compensation.

As explained above, when gradual decoder refresh is performed using isolated regions, the isolated regions evolve in size, shape and location. Ultimately, as a result of the gradual decoder refresh process, a reliable (i.e. completely reconstructed) frame is obtained. This is achieved when an isolated region evolves to become equal to an entire frame (i.e. it covers the whole picture area). According to the invention, once this situation has been reached, the following limitations are imposed on the coding of subsequent frames:

1. New isolated regions must avoid prediction from the previous IREG GOP;
2. For left-over regions, prediction referring to left-over regions in frames prior to the reliable frame and referring to any block in frames temporally before the previous IREG GOP should be avoided. Proper reference frame limitations and motion vector limitations similar to those described above are applied in order to meet these two requirements.

In frames where the GDR technique using isolated regions implemented according to the invention is used, each picture contains one isolated region and a left-over region. The isolated region is a slice group, and the left-over region is another slice group. The region shapes of the two slice groups evolve and follow the evolution of the isolated region from picture to picture, according to the signaled region growth rate.

The present invention further introduces additional syntax to be included in the H.264 video coding standard to enable signaling of isolated regions. More specifically, according to the invention, some new mb_allocation_map_types are added to the H.264 standard syntax. These are shown below in Table 1, where added syntax elements introduced in order to support isolated regions are denoted by "IREG" in the right-hand column and "RECT" denotes rectangular slice groups (as proposed in JVT-D095):

TABLE 1

| Syntax to Support Independent Regions According to the Invention | | | |
|---|---|---|---|
| Num_slice_groups_minus1 | 0 | u(3) | |
| if( num_slice_groups_minus1 > 0) { /* use of Flexible MB Order */ | | | |
| Mb_allocation_map_type | 0 | e(v) | |
| if(mb_allocation_map_type = = 0) | | | |
| for(i=0; 1<=max_slice_group_id; i++) | | | |
| run_length | 0 | e(v) | |
| Else if(mb_allocation_map_type = = 2) | | | |
| for(i=0; i<num_mbs_in_picture; i++) | | | |
| slice_group_id | 0 | u(3) | |
| Else if(mb_allocation_map_type = = 3) { | | | RECT |
| for(i=0; I<max_slice_group_id; i++) { | | | RECT |
| top_left_mb | 0 | u(v) | RECT |
| Bottom_right_mb | 0 | u(v) | RECT |
| } | | | RECT |
| } | | | RECT |
| else if(mb_allocation_map_type = = 4 ‖ | | | IREG |
| mb_allocation_map_type = = 5 ‖ | | | |
| mb_allocation_typ = = 6) { | | | |
| Evolution_direction | 0 | u(1) | IREG |
| Growth_rate | 0 | e(v) | IREG |
| } | | | IREG |
| } | | | |

In Table 1, the parameter num_slice_groups_minus1 is set to 1 when the mb_allocation_map_type is 4, 5, or 6 (i.e. there are only two slice groups in the picture). The growth_rate parameter represents the number of macroblocks by which an isolated region grows per picture. Using the growth-rate parameter and knowing the size of a picture to be refreshed, a decoder can determine the time required to completely refresh the entire picture (known as the GDR period) For example, in the case of QCIF pictures (which comprise 99 16×16 pixel macroblocks in an 11×9 rectangular array) and a growth_rate of 10 macroblocks per picture, achieving a fully refreshed picture takes ceil(99/10)=10 pictures from the start of the GDR period (inclusive).

The new mb_allocation_map_types 4, 5, 6, and evolution_directions defined according to the invention and presented in Table 1 define six slice group evolution patterns for isolated regions, as shown below in Table 2:

TABLE 2

| New Slice Group Evolution Patterns according to the Invention | |
|---|---|
| (mb_allocation_map_type, evolution_direction) | Region Evolution Pattern |
| (4, 0) | Box out clockwise |
| (4, 1) | Box out counter-clockwise |
| (5, 0) | Raster scan |
| (5, 1) | Reverse raster scan |
| (6, 0) | Wipe right |
| (6, 1) | Wipe left |

The six region evolution patterns presented in Table 2 are defined as follows:

1. Raster scan: The first macroblock of the isolated region is the top-left macroblock of the picture. The isolated region grows in raster scan order.
2. Reverse raster scan: The first macroblock of the isolated region is the bottom-right macroblock of the picture. The isolated region grows in reverse raster scan order.
3. Wipe right: The first macroblock of the isolated region is the top-left macroblock of the picture. The isolated region grows from top to bottom. The next macroblock after the bottom-most macroblock of a column is the top macroblock of the column on the right-hand-side of the previous column.
4. Wipe left: The first macroblock of the isolated region is the bottom-right macroblock of the picture. The isolated region grows from bottom to top. The next macroblock after the top-most macroblock of a column is the bottom macroblock of the column on the left-hand-side of the previous column.

Figure 4:
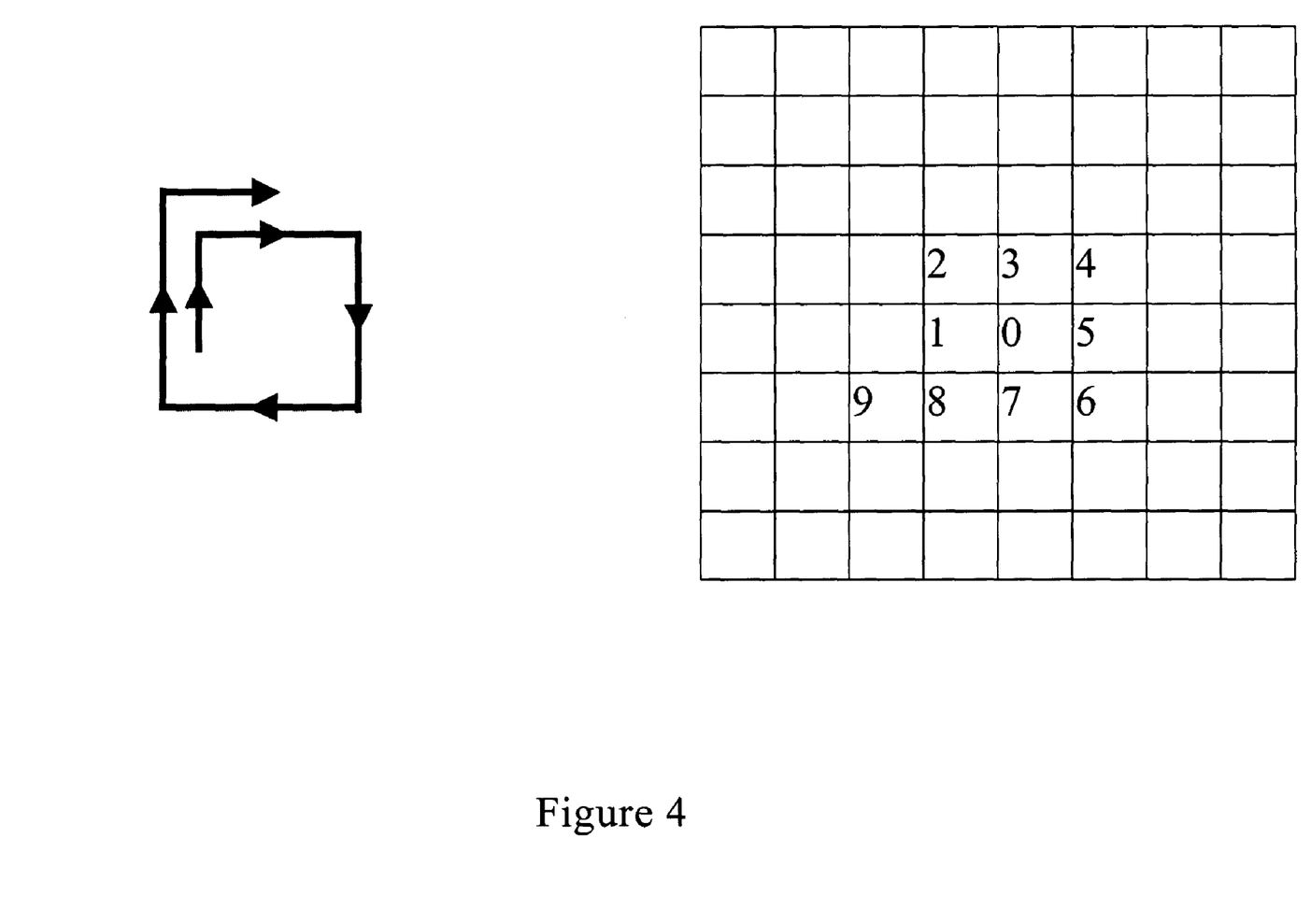
FIG. 4 illustrates the growth order of box-out clockwise shape evolution, according to the present invention A practical implementation of gradual decoder refresh according to the present will now be described.

5. Box out clockwise: Using an (x, y) coordinate system with its origin at the top-left macroblock and having macroblock granularity and using H to denote the number of coded macroblock rows in the picture and W to denote the number of coded macroblock columns of the picture, the first macroblock of the isolated region is the macroblock having coordinates (x0, y0)=(W/2, H/2). "/" denotes division by truncation. The growth order of the isolated region is defined as shown in FIG. 4 of the appended drawings.

6. Box out counter-clockwise: Using the same definitions of coordinate system, variables and the arithmetic operation as introduced in 5 above, the first macroblock of the isolated region is the macroblock having coordinates (x0, y0)=((W−1)/2, (H−1)/2). The growth order is similar to that shown in FIG. 4 but in the counter-clockwise direction.

In order to let decoders, coded-domain editing units and network elements distinguish a random access point easily, a preferred embodiment of the present invention proposes that the start of a GDR period is signaled in the Network Adaptation Layer (NAL) unit type of the H.264 syntax. The first picture of a GDR period is called a GDR picture. A precise syntax is not required, but an exemplary syntax that could be used can be found in the JVT-C074 working draft.

The present invention also proposes mechanisms for reliable indication of ODR pictures and leading frames.

In a manner similar to that just described in connection with the signaling of a GDR picture, the invention proposes that an ODR picture is provided with a dedicated NAL unit type.

Furthermore, in a preferred embodiment of the invention, leading frames are explicitly marked. This approach is preferred because it imposes no constraints or complications on encoder implementations and provides a mechanism by which decoders can easily identify leading frames. According to the invention, leading pictures can be any motion compensated pictures, i.e., P, B, and SP pictures (the SP picture type is a special type of motion compensated picture defined according to H.264). Advantageously, a flag (termed a leading_picture_flag) is associated with these picture types and is added in the H.264 NAL unit type syntax or in the picture or slice header syntax, in order to provide an explicit indication that a given picture is a leading picture. This option is particularly advantageous, as it involves very little or no bit-rate overhead and is easy to use for both encoders and decoders.

According to the invention, random access points are indicated using the "sub-sequence identifier" as presented in JVT document JVT-D098.

The precise syntax for signaling of GDR and ODR pictures and leading pictures may vary according to the details of the NAL unit type syntax adopted in the H.264 video coding standard.

An ODR picture defined according to the invention has the following characteristics:
1. The decoding process can be started or restarted after a random access operation from an ODR picture.
2. An ODR picture contains only I or SI slices;
3. The ODR NAL unit contains a slice EBSP; and
4. The ODR NAL unit type is used for all NAL units containing coded macroblock data of an ODR picture.

A GDR picture defined according to the invention has the following characteristics:
1. The decoding process can be started or restarted after a random access operation from a GDR picture;
2. A GDR picture can be coded with any coding type.
3. The GDR NAL unit type is used for all NAL units containing coded macroblock data of a GDR picture.

According to the invention, the leading_picture_flag associated with a leading picture has the following characteristics:
1. The leading_picture_flag signals a picture that shall not be decoded if the decoding process was started from a previous ODR picture in the decoding order and no IDR picture occurred in the decoding order between the current picture and the ODR picture.
2. The leading_picture_flag enables random access to an ODR picture that is used as a motion compensation reference for temporally previous pictures in presentation order, without decoding those frames that cannot be reconstructed correctly if the ODR picture is accessed randomly.

The following changes in the H.264 decoding process result from adopting ODR and GDR pictures and the mechanisms for signaling of random access points and leading frames as defined according to the present invention:
1. If the sub-sequence identifier of a GDR or an ODR picture is different from the previous received sub-sequence identifier, the decoder infers a GDR or an ODR refresh operation, and the maximum long-term frame index is reset to 0.
2. If an ODR operation started from an ODR picture and if no ODR or IDR picture was decoded since the initial ODR picture, a picture having a leading_picture_flag equal to "1" is not decoded.
3. If a GDR operation started from a GDR picture, the decoder does not decode any left-over regions and does not infer a loss of data if a left-over region is not received.

The invention claimed is:

1. A method of encoding a video sequence, comprising:
providing a first indication in an encoded bitstream by a video encoder, the first indication indicating whether or not all coded pictures at and subsequent to an intra-coded picture in display order can be correctly decoded when a decoding process is started from the intra-coded picture; and
encoding a first picture into the encoded bitstream by the video encoder, using motion-compensated prediction with reference to one or more previously coded reference pictures, the first picture having a display order prior to the intra-coded picture and an encoding order succeeding the intra-coded picture;
providing a second indication in the encoded bitstream by the video encoder corresponding to the first picture, which indication indicates whether or not the first coded picture can be correctly decoded when the decoding process is started from the intra-coded picture;
performing motion compensated prediction by the video encoder for at least part of a second picture with reference to the first coded picture.

2. A method according to claim 1, wherein the first indication and/or the second indication is provided in NAL unit-type syntax.

3. A method according to claim 1, wherein the first indication and/or the second indication is provided in a picture header.

4. A method according to claim 1, wherein the first indication and/or the second indication is provided in a slice header.

5. A method according to claim 1, wherein an indication of a random access point is provided using a sub-sequence identifier.

6. A method of encoding a video sequence, comprising:
encoding, into an encoded bitstream by a video encoder, a first picture into the encoded bitstream, using motion-compensated prediction with reference to one or more previously coded reference pictures, the first picture having a display order prior to an intra-coded picture and an encoding order succeeding the intra-coded picture;
providing an indication in the encoded bitstream corresponding to the first picture, which indication indicates if at least one of said one or more previously coded reference pictures precedes the intra coded picture in decoding order; and
performing motion compensated prediction by the video encoder for a second picture with reference to said first picture.

7. A method according to claim 6, wherein the first indication is provided in NAL unit-type syntax.

8. A method according to claim 6, wherein the first indication is provided in a picture header.

9. A method according to claim 6, wherein the first indication is provided in a slice header.

10. A method according to claim 6, wherein an indication of a random access point using a sub-sequence identifier.

11. A method of decoding an encoded bitstream, comprising:
retrieving, by a video decoder, from the encoded bitstream, a first indication corresponding to an intra-coded picture, the first indication indicating that all coded pictures at and subsequent to the intra-coded picture in display order can be correctly decoded when a decoding process is started from the intra-coded picture; and
based on the decoded first indication, decoding the encoded bitstream by the video decoder, the decoding starting from the intra-coded picture,
decoding from the encoded bitstream a second indication corresponding to a first coded picture, the second indication indicating whether or not the first coded picture can be correctly decoded when decoding is started from the intra-coded picture, and
discarding the first coded picture without decoding.

12. A method according to claim 11, wherein the indication is retrieved from NAL unit-type syntax.

13. A method according to claim 11, wherein the indication is retrieved from a picture header.

14. A method according to claim 11, wherein the indication is retrieved from a slice header.

15. A method, comprising:
retrieving, by a video decoder, from the encoded bitstream, a first indication corresponding to an intra-coded picture at a random access location, the first indication indicating that all decoded coded pictures at and subsequent to the intra-coded picture at the random access location in display order can be correctly decoded when a decoding process is started from the intra-coded picture at the random access location; and
retrieving, from the encoded video sequence, information corresponding to a first picture encoded using motion-compensated prediction with reference to one or more previously coded reference pictures, the first picture having a display order prior to the intra-coded picture at the random access location and a decoding order succeeding the intra-coded picture at the random access location; and
if the retrieved information corresponding to the first picture indicates that the at least one of said one or more previously coded reference pictures precedes the intra-coded picture at the random access location in decoding order, discarding the encoded first picture without decoding; and continuing the decoding process with the encoded pictures succeeding the first picture in the decoding order.

16. A method of decoding an encoded bitstream, comprising:
retrieving, from the encoded bitstream by a video decoder, a first indication corresponding to a first coded picture, the first indication indicating whether or not at least a part of at least the first coded picture was encoded with reference to a picture preceding a coded picture in encoding order, said first coded picture having a decoding order succeeding the intra-coded picture, said first coded picture used for motion-compensated prediction for at least a second coded picture; and
starting decoding from the intra-coded picture,
decoding the intra-coded picture,
decoding the first indication,
based on the decoded first indication, determining whether or not to decode the first coded picture.

17. A method according to claim 16, further comprising, if the first indication indicates that at least a part of the at least one picture is encoded with reference to a picture preceding the intra-coded picture in encoding order:
discarding the at least one picture without decoding; and
continuing the decoding process with encoded pictures succeeding the first picture in the decoding order.

18. A method according to claim 16, wherein the first indication is retrieved from NAL unit type syntax.

19. A method according to claim 16, wherein the first indication is retrieved from a picture header.

20. A method according to claim 16, wherein the first indication is retrieved from a slice header.

21. A method according to claim 16, wherein a random access location is determined by examining sub-sequence identifiers for encoded pictures.

22. A method according to claim 11, further comprising continuing the decoding process with the encoded pictures succeeding the first coded picture in the decoding order.

23. A method according to claim 22, the first coded picture being used for motion compensated prediction for at least a part of a second coded picture.

24. An encoder configured for:
providing a first indication in an encoded bitstream by a video encoder, the first indication indicating whether or not all coded pictures at and subsequent to an intra-coded picture in display order can be correctly decoded when a decoding process is started from the intra-coded picture; and
encoding a first picture into the encoded bitstream by the video encoder, using motion-compensated prediction with reference to one or more previously coded reference pictures, the first picture having a display order prior to the intra-coded picture and an encoding order succeeding the intra-coded picture;
providing a second indication in the encoded bitstream by the video encoder corresponding to the first picture, which indication indicates whether or not the first coded picture can be correctly decoded when the decoding process is started from the intra-coded picture;

performing motion compensated prediction by the video encoder for at least part of a second picture with reference to the first coded picture.

25. A decoder configured for:

retrieving, by a video decoder, from the encoded bitstream, a first indication corresponding to an intra-coded picture, the first indication indicating that all coded pictures at and subsequent to the intra-coded picture in display order can be correctly decoded when a decoding process is started from the intra-coded picture; and based on the decoded first indication, decoding the encoded bitstream by the video decoder, the decoding starting from the intra-coded picture, decoding from the encoded bitstream a second indication corresponding to a first coded picture, the second indication indicating whether or not the first coded picture can be correctly decoded when decoding is started from the intra-coded picture, and discarding the first coded picture without decoding.

* * * * *